US005335822A

United States Patent [19]

Kasper

[11] Patent Number: 5,335,822

[45] Date of Patent: Aug. 9, 1994

[54] APPARATUS FOR DISPENSING TICKETS FROM A STACK

[75] Inventor: Kazmier J. Kasper, Hopkinton, Mass.

[73] Assignee: Algonquin Industries, Inc., Bellingham, Mass.

[21] Appl. No.: 29,689

[22] Filed: Mar. 11, 1993

[51] Int. Cl.[5] .............................................. B65G 59/06

[52] U.S. Cl. .................................... 221/259; 221/304; 221/279; 221/198; 221/232; 221/258; 221/268; 221/274; 221/281

[58] Field of Search ............... 221/259, 304, 287, 279, 221/197, 198, 64, 178, 179, 226, 232, 243, 245, 258, 268, 270, 274, 281

[56] References Cited

U.S. PATENT DOCUMENTS

| | | | |
|---|---|---|---|
| 537,811 | 4/1895 | Bowie . | |
| 861,245 | 7/1907 | Armstrong . | |
| 1,056,809 | 3/1913 | McCulloch | 221/259 X |
| 1,398,283 | 11/1921 | Stice et al. | 221/274 X |
| 1,513,248 | 10/1924 | Johnson | 221/270 X |
| 1,633,937 | 6/1927 | Ford . | |
| 1,889,689 | 11/1932 | Millis . | |
| 2,078,984 | 5/1937 | Williamson | 221/259 X |
| 2,385,956 | 10/1945 | Wognum | 221/232 X |
| 2,637,609 | 5/1953 | Berg | 221/259 X |
| 3,228,554 | 1/1966 | Huffman | 221/243 X |
| 3,790,161 | 2/1974 | Ericsson | 221/197 X |
| 3,887,106 | 6/1975 | Charlson et al. | 221/259 X |
| 4,039,181 | 8/1977 | Prewer . | |
| 4,140,259 | 2/1979 | Kostka . | |
| 4,391,387 | 7/1983 | Bayne . | |
| 4,603,792 | 8/1986 | Molineux | 221/232 X |
| 4,704,518 | 11/1987 | Brunn . | |
| 4,716,799 | 1/1988 | Hartmann . | |
| 4,717,043 | 1/1988 | Groover . | |
| 4,982,337 | 1/1991 | Burr . | |
| 5,018,614 | 5/1991 | Ruckert . | |
| 5,176,237 | 1/1993 | Yang . | |
| 5,232,123 | 8/1993 | Richardson et al. | 221/259 |

FOREIGN PATENT DOCUMENTS

| | | | |
|---|---|---|---|
| 429635 | 6/1926 | Fed. Rep. of Germany | 221/232 X |
| 2588106 | 4/1987 | France | 221/259 X |
| 659146 | 12/1986 | Switzerland | 221/304 X |
| 2176176 | 12/1986 | United Kingdom | 221/258 X |

*Primary Examiner*—Robert P. Olszewski
*Assistant Examiner*—Dean A. Reichard
*Attorney, Agent, or Firm*—Kriegsman & Kriegsman

[57] ABSTRACT

An apparatus for dispensing tickets from a stack includes a base. A frame for enclosing a stack of tickets is fixedly mounted on the base. A partition wall whose position can be changed to accommodate tickets of different sizes is removably mounted in the frame. A gate for receiving tickets and allowing only one ticket at a time to pass through is also fixedly mounted on the base. The gate includes a slider element which is adjusted to different heights by a screw having two different sized threads in order to accommodate tickets of different thickness. A toothed blade is disposed underneath the frame and a mechanism which includes a motor driven rack and pinion is coupled to the toothed blade for bringing the toothed blade into engagement with the lowermost ticket in the stack, moving said toothed blade so that the lowermost ticket is transported from the stack into the gate, bringing the toothed blade out of engagement with the ticket and then moving the toothed blade back to engage the next ticket in the stack. A removable weight is seated on top of the stack to push the stack down against the toothed blade. A ticket holder is provided to assist in loading tickets into the frame.

10 Claims, 8 Drawing Sheets

APPARATUS FOR DISPENSING TICKETS FROM A STACK

BACKGROUND OF THE INVENTION

The present invention relates generally to an apparatus for dispensing tickets and more particularly to an apparatus for dispensing tickets from a stack. The invention is particularly suited for use with regard to dispensing pull-tab type lottery tickets; however, it is to be understood that the invention is not exclusively limited to use with dispensing only pull tab type lottery tickets, but rather may be used with dispensing other types of tickets.

Apparatus for dispensing tickets from a stack are well known in the art. Such apparatus often includes a frame holding the stack of tickets, a gate through which the tickets are dispensed and a mechanism for moving the tickets from the stack into the gate.

As an example, in U.S. Pat. No. 3,790,161 to K. E. Ericsson there is disclosed an apparatus for feeding sheets, cards, banknotes and the like from a stack comprising a rotary roll which engages the lowermost sheet, card or banknote tn the stack, a further roll spaced from the preferably slightly above the first roll, and a trip having a rough coating and so arranged between the two rolls as to extend inside a plane tangent to the peripheries of the rolls.

As another example, in U.S. Pat. No. 5,018,614 to W. D. K. Ruckert there is disclosed a ticket vending machine wherein an outer housing encloses an inner panel separating a money accepting and ticket dispensing apparatus. The money accepting apparatus releases an internal lever upon insertion of the correct money. This internal lever disengages from a toothed plate which is connected by a shaft to an external hand lever. A pulling of the external hand lever after insertion of the correct money turns multiple gears which cause a cam to actuate to release a ticket retaining gate. In addition, the gears are connected to a cylindrical rear roller which turns a pair of latex bands mounted around the rear roller and a front cylindrical roller mounted on an idler shaft. A weight over the tickets causes frictional pressure to be exerted on the ticket by turning bands and thereby allows the bands to move a single ticket under a raised exit gate.

In another type of apparatus for dispensing tickets from a stack, the tickets are moved from the stack into a gate by a rotably mounted toothed wheel located underneath the stack.

In U.S. Pat. No. 4,704,518 to F. A. Brumm et al there is disclosed an apparatus for printing and issuing tickets which has a circular ticket guide in which a drive cylinder is disposed to selectively rotate in a forward or reverse direction. A ticket magazine feeds a blank ticket into the ticket guide in the forward direction and the cylinder rotates, driving the ticket in the forward or reverse direction in order to execute a series of process steps involved in issuing the written ticket. The tickets are stacked in the magazine obliquely on edge and retained in a pack configeration at the lower end of the magazine by a gravity actuated ticket retainer. Arrayed in an arcuate sequence adjacent the ticket guide in the forward direction are a printing and reading apparatus, a ramped impound aperture, and a ramped issue aperture. A ticket is fed from the hopper in the forward direction and the drive cylinder is rotated to carry the ticket past the printing and reading apparatus where information is written and verified on the ticket. The drive cylinder continues to rotate in the forward direction, carrying the ticket pass the impound, and then the issue aperture. The drive cylinder then reverses , first offering the ticket through the issue aperture and then, if the ticket is not manually removed from the aperture, the drive cylinder is rotated to feed the ticket into an impound enclosure through the impound aperture.

Some of the problems associated with known apparatus for dispensing tickets from a stack are (1) damaging of the tickets by the dispensing mechanism, (2) jamming of the tickets being dispensed, and (3) more than one ticket being dispensed at a time.

In U.S. Pat. No. 4,716,799 to D. Hartmann there is disclosed an automatic ticket dispensing machine and a method for operating it to automatically adjust itself to the size of tickets being dispensed. A strip of tickets is fed forward with an advancing mechanism past an optical sensor which detects the perforations between tickets. The optical sensor is coupled to a controller which controls the advancing mechanism. The controller determines the length of the ticket by monitoring the distance the tickets are advanced between detections of perforations. In response to a request for a ticket, the controller advances the ticket strip by a distance corresponding to the predetermined ticket length of output.

In U.S. Pat. No. 4,982,337 to Burr et al there is disclosed a system and method for distributing lottery tickets which includes a large number of remote, ticket-dispensing units which are connected intermittently, e.g., once each day or week to a central computer. The units record the number of tickets sold and transmit the sales data to the central computer, which in turn performs all the necessary accounting functions. Sales reports and invoice data may be sent by the central computer to each unit for printing, which avoids the need to mail the reports/invoices. The tickets are stored in fanfold form and are burst, rather than cut, apart for dispensing. The tickets are dispensed at one end of the unit which faces the customer. A control panel for the vendor is located at the opposite end. Tickets of different length may be dispensed with an imprint of the vendor's name.

It is an object of this invention to provide a new and improved apparatus for dispensing tickets.

It is another object of this invention to provide a new and improved apparatus for dispensing tickets from a stack.

It is a further object of this invention to provide an apparatus as described above which includes a new and novel arrangement for moving the tickets from the stack into a gate where they can be dispensed one at a time.

It is still a further object of this invention to provide an apparatus as described above which includes a new and novel gate which insures that only one ticket is dispensed at a time and which is easily adjustable to accommodate tickets of different thicknesses,

SUMMARY OF THE INVENTION

An apparatus constructed according to this invention for dispensing tickets from a stack comprises a frame for enclosing a plurality of tickets in a stack, one on top of the other, a gate for receiving tickets from the stack and allowing only one ticket at a time to pass through, a toothed blade disposed underneath said frame, and means coupled to said toothed blade for bringing said toothed blade into engagement with the lowermost ticket in said stack, moving said toothed blade so that each successive lowermost ticket in the stack is transported from said stack into said gate, one at a time, bringing said toothed blade out of engagement with said ticket so transported after it has been moved into the gate and then moving said toothed blade back where it can be brought back into engagement with the next successive lowermost ticket in the stack.

In a preferred embodiment of the invention, a removable partition wall is provided for changing the inside area of the frame to accommodate different sized tickets.

In still a further preferred embodiment of the invention, a removable weight is disposed on top of the stack to exert sufficient pressure on the stack to enable the toothed blade to move the lowermost ticket in the stack when brought into engagement with it.

In yet still a further preferred embodiment of the invention a holder is provided to enable easy loading of tickets into the frame and the frame is constructed so as to allow usage of the holder.

Various features and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENTS

Figure 1:
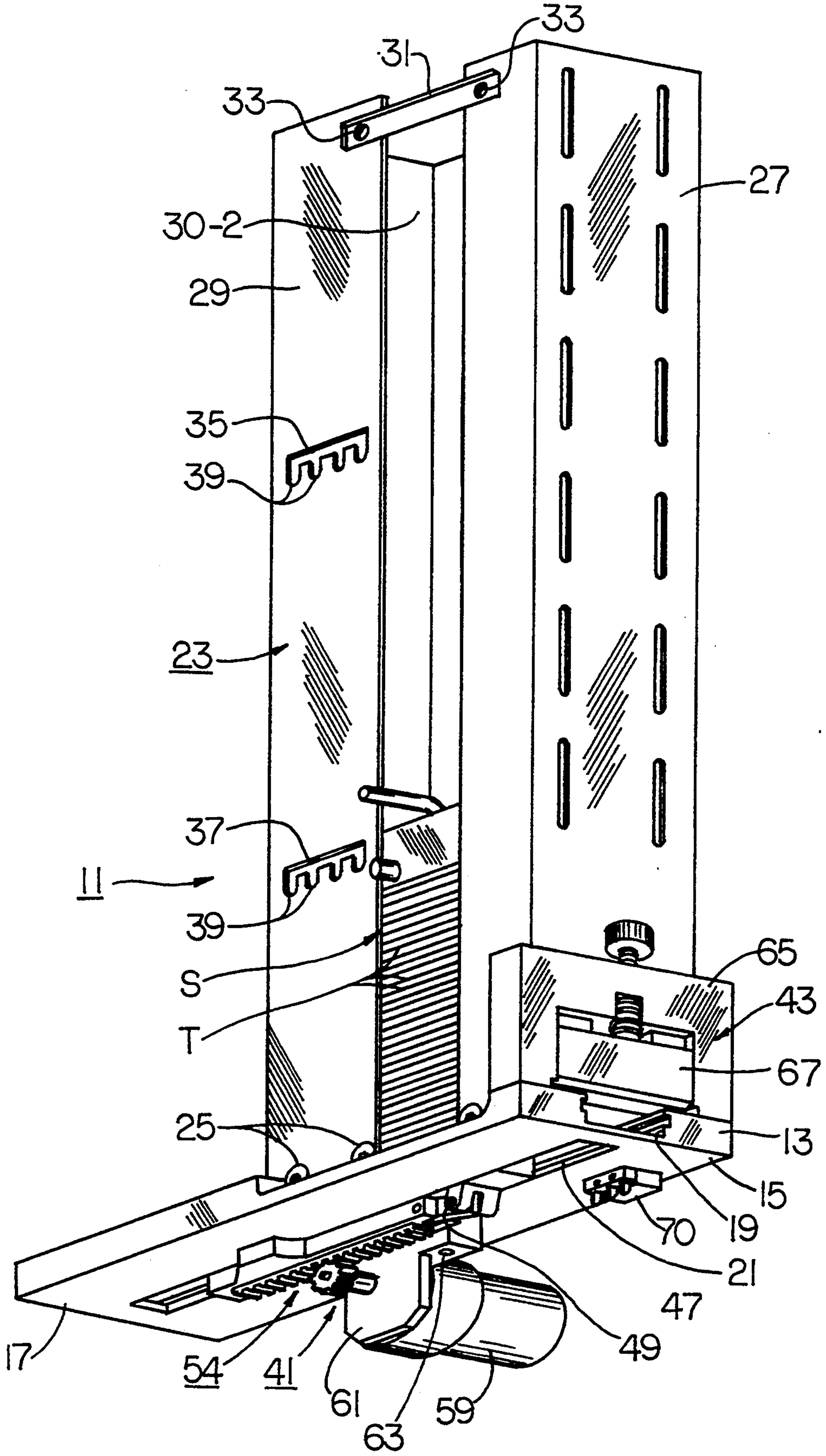
FIG. 1 is a simplified pictorial representation of an apparatus constructed according to this invention for dispensing tickets from a stack.

Referring now to the drawings, there is shown in FIG. 1 an apparatus constructed according to this invention for dispensing tickets, the apparatus being identified by reference numeral 11.

Figure 2:
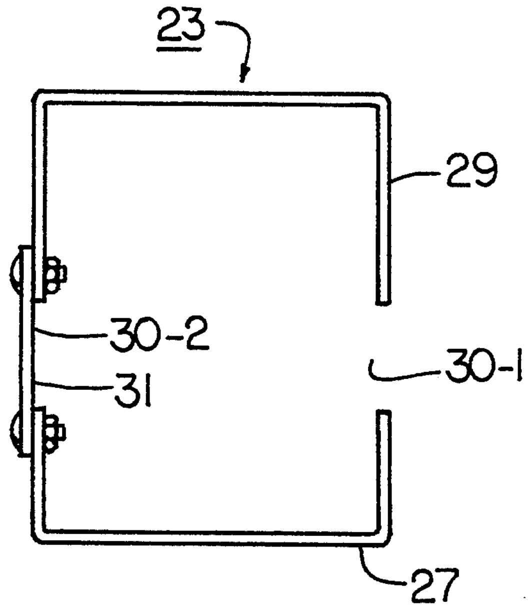
FIG. 2 is a top view of the frame shown in the apparatus in FIG. 1.
Figure 11:
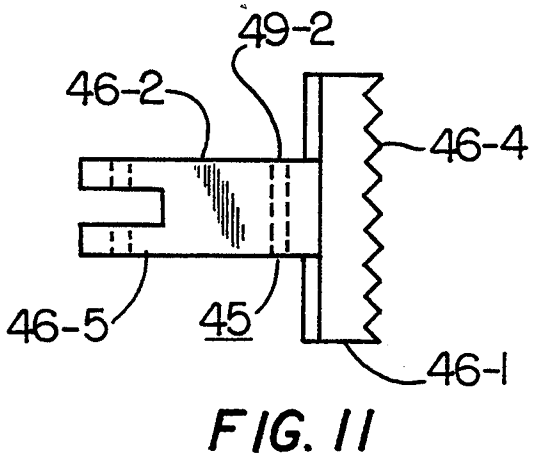
FIGS. 11 and 12 are top and side views respectively of the toothed blade shown.
Figure 12:
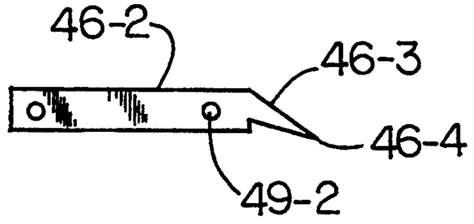
Figure 3:
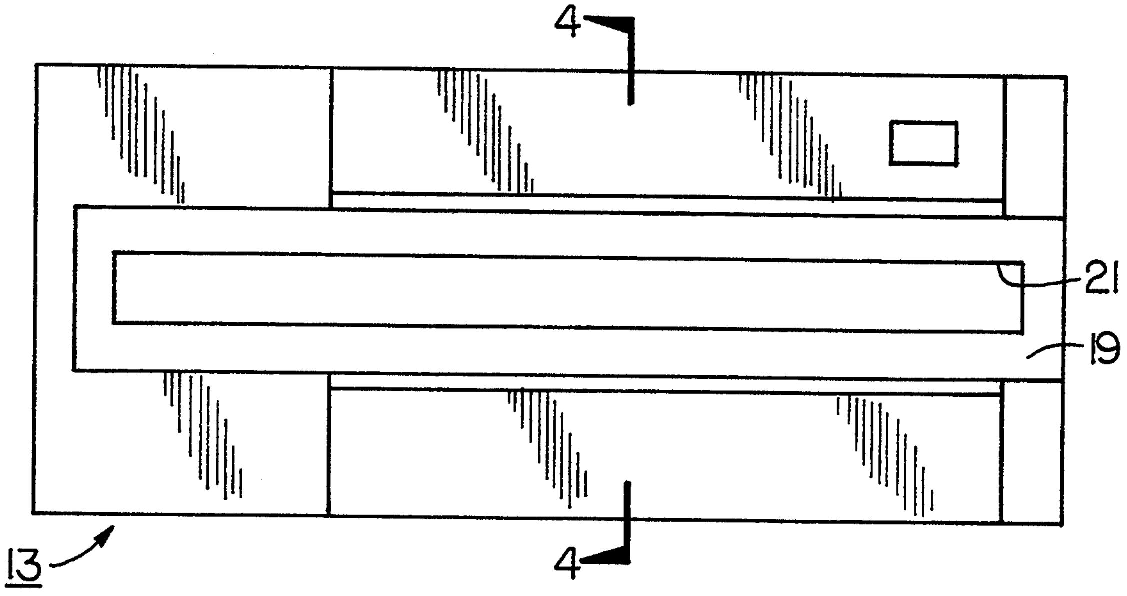
FIG. 3 is a top plan view of the base in the apparatus shown in FIG. 1.
Figure 4:
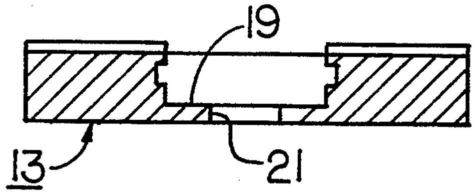
FIG. 4 is a section view of the base taken along 1 the 4—4 in FIG. 3.

Apparatus 11 includes a generally rectangularly shaped base 13 made of aluminum or other similar sturdy material. Same 13, which is also shown separately in FIGS. 3 and 4, includes a front end 15 and a rear end 17. An elongated longitudinally disposed rectangular recess 19 having at the bottom an elongated rectangularly shaped opening 21 is formed tn base 13. A frame 23 for holding a plurality of tickets T in a stack S, one on top of the other, is fixedly mounted on base 13 by bolts 25. Tickets T may be for example, pull tab type lottery tickets. Frame 23, which is also shown in FIG. 2, is made of aluminum and includes a U shaped front panel 27 and a U shaped rear panel 29. The two panels 27 and 29 are mounted on base 13 in spaced apart relationship so as to provide left and right openings 30-1 and 30-2, respectively. A bracket 31 is attached by bolts 33 to panels 27 and 29 on one side at the top to provide additional support for frame 23. Upper and lower slots, 35 and 37, respectively, are formed on each side of rear panel 29. Each slot 35, 37 is shaped to include a plurality of notches 39.

Apparatus 11 further includes a transport mechanism 41 and a gate 43. The purpose of transport mechanism 41 is to transport tickets T from stack S into gate 43. The purpose of gate 43 is to receive tickets T transported to it from frame 23 and allow only one ticket at a time to pass through.

Figure 9:
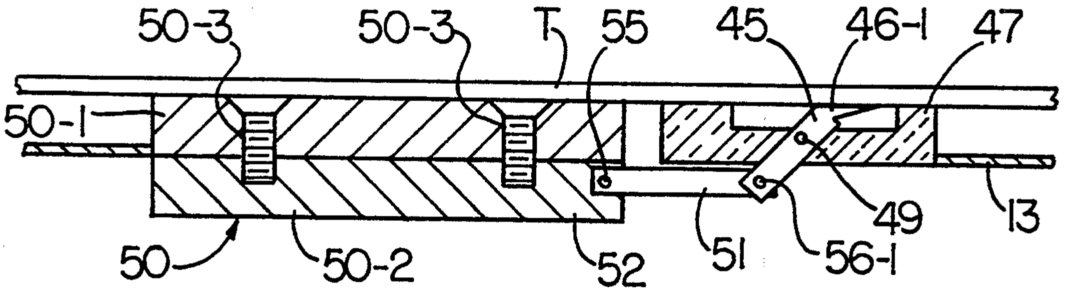
FIG. 9 is a side section view of the parts shown in FIG. 8 position below a ticket with the head of the toothed blade horizontal.
Figure 10:
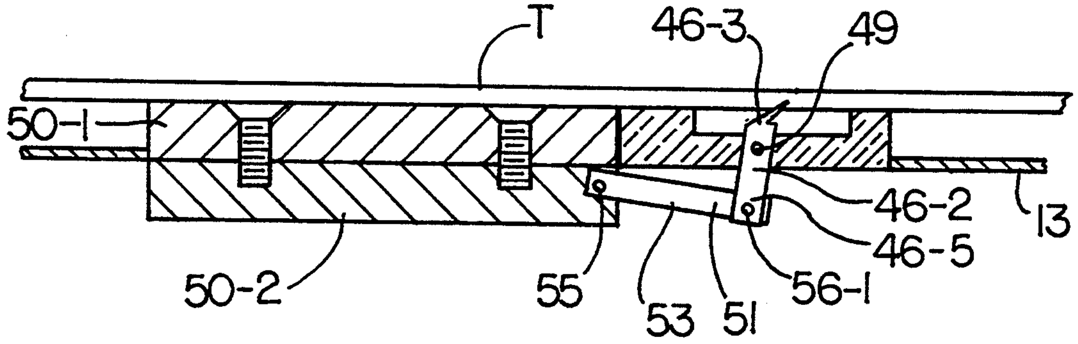
FIG. 10 is a side section view of the parts shown in FIG. 8 with the head of the toothed blade angled up for engagement with the ticket.

Transport mechanism 41, parts of which are also shown in FIGS. 8–13, includes a toothed blade 45 made of tool steel. Blade 45 is a unitary structure and includes a head portion 46-1 and a stem portion 46-2. Head portion 46-1 includes a top surface 46-3 and a serrated edge 46-4. Stem portion 46-2 is bifircated at its lower end 46-5. Blade 45 is mounted for pivotal movement on a first slider element 47 by a pivot pin 49 which extends through a hole not shown formed in slider element 47 and a hole 49-2 formed in the stem 46-2 of toothed blade 45. First slider element 47 is generally rectangularly shaped and is is mounted for slidable movement back and forth in recess 19 of base 13. Toothed blade 45 is coupled to a second slider element 50 by an elongated link 51. Second slider element 50 includes an upper piece 50-1 and a lower piece 50-2 which are fixedly secured to each other by bolts 50-3. One end 52 of link 51 is pivotally attached to second slider element 50 by a pivot pin 55. The other end of link 51 is pivotally attached to the bottom 46-5 of the stem portion 46-2 of toothed blade 45 by a pivot pin 56-1. Second slider element 50 is slidably mounted in recess 19 of base 13 behind first slider element 47 with piece 50-1 seated in recess 19 and piece 50-2 disposed underneath base 13. With the two sliders spaced apart as shown in FIG. 9 top surface 46-3 of head 46-1 is horizontal. Movement of second slider element 50 in recess 19 in a forward direction toward first slider element 47 will result in pivotal movement downward of link 51. This in turn will produce pivotal movement upward of head portion 46-1 toothed blade 45 in first slider element 47. Head portion 46-1 will continue to pivot upward until second slider element 50 hits up against first slider element 47. At this time, top surface 46-3 is pivoted up about 10 degrees from the horizontal as shown in FIG. 10. When second slider 50 is moved in a rearward direction head portion 46-1 will be pivoted back to a horizontal position. First and second slider elements 47 and 50, respectively, are made of a rigid plastic material, such as Delrin.

Second slider element 50 is moved back and forth in recess 19 by a rack and pinion 54. Rack and pinion 54 includes an elongated rack 54-1 which is press fit into a longitudinal recess 55-1 formed in the bottom of second slider element 50 and a pinion 57. Pinion 57 is driven by a reversible motor 59 which is fixedly mounted on base 13 by a bracket 61. Bracket 61 is secured to base 13 by bolts 63.

A removable weight 78 may be disposed on rod of stack S to insure that edge 46-4 of blade 45 will engage the bottom surface of the lowermost ticket T in stack S sufficiently so that it can move it.

Figure 7:
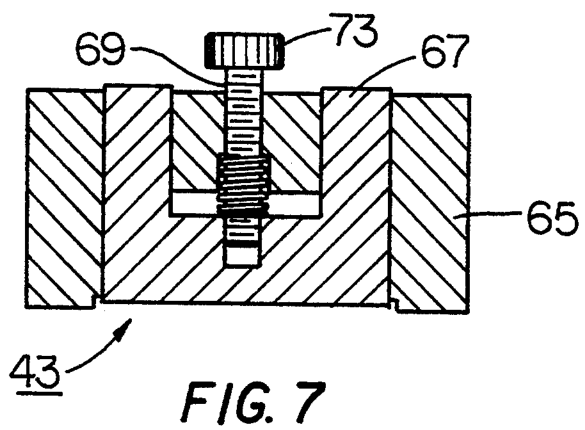
FIG. 7 is a front section view of the gate shown in FIG. 5.
Figure 6:
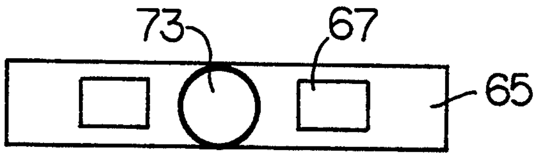
FIG. 6 is a top view of the gate shown in FIG. 5.
Figure 5:
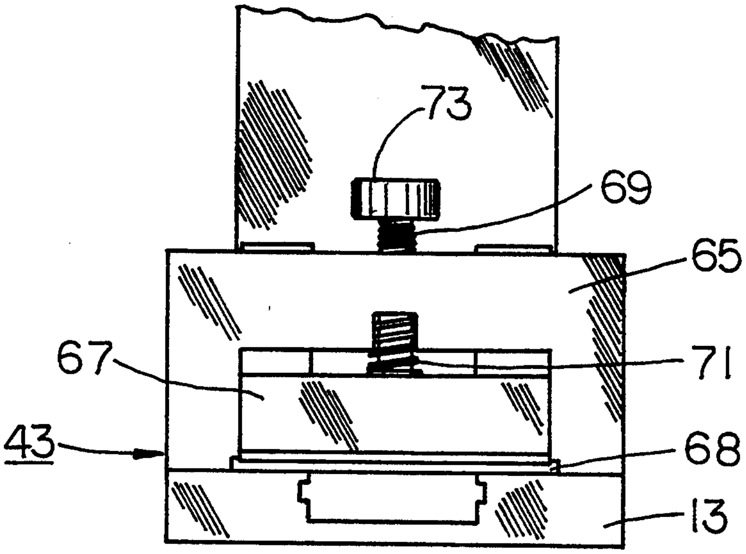
FIG. 5 is a fragmentary front view of the apparatus shown in FIG. 1.
Figure 8:
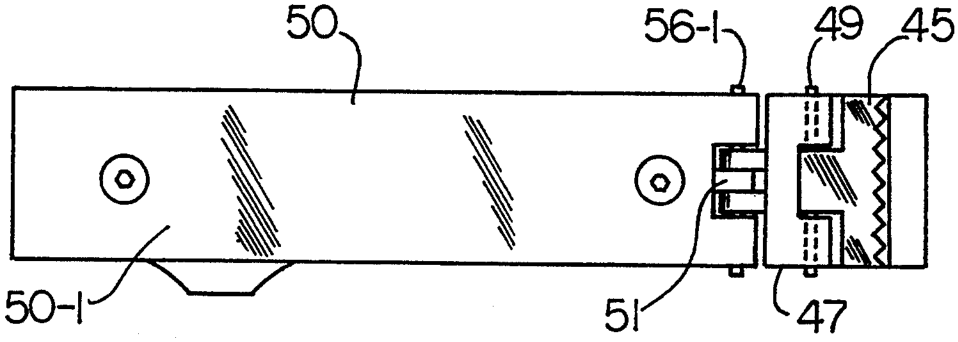
FIG. 8 is a top view of the two slider elements, the toothed blade and the connecting I ink in the apparatus shown in FIG. 1.

Gate 43, which is also shown in FIGS. 5 through 7, includes a U shaded frame 65 which is fixedly secured to base 13 by bolts (not shown). A slider 67 is slidably mounted for up and down movement on frame 65, the space between the bottom of slider 67 and base 13 serving as an opening through which a ticket can pass. The size (i.e. height) of the opening is controlled by raising or lowering slider 67. This adjustment of slider 67 is accomplished using a screw 69 and a tension spring 71. Screw 69 has two different sized threads. The fixer threads are on the rod and in threaded engagement with with frame 65 while the courser threads are on the bottom and in threaded engagement with slider 67. Screw 69 is turned using a knob 73. Preferably the top threads are ¼-20 while lower threads are 10-32. As such, a one-half revolution of handle 73 will move slider 67 about 0.0012 inches.

An indicator switch 70 for indicating that there are no more tickets in frame 23 is mounted on base 13.

Figure 13:
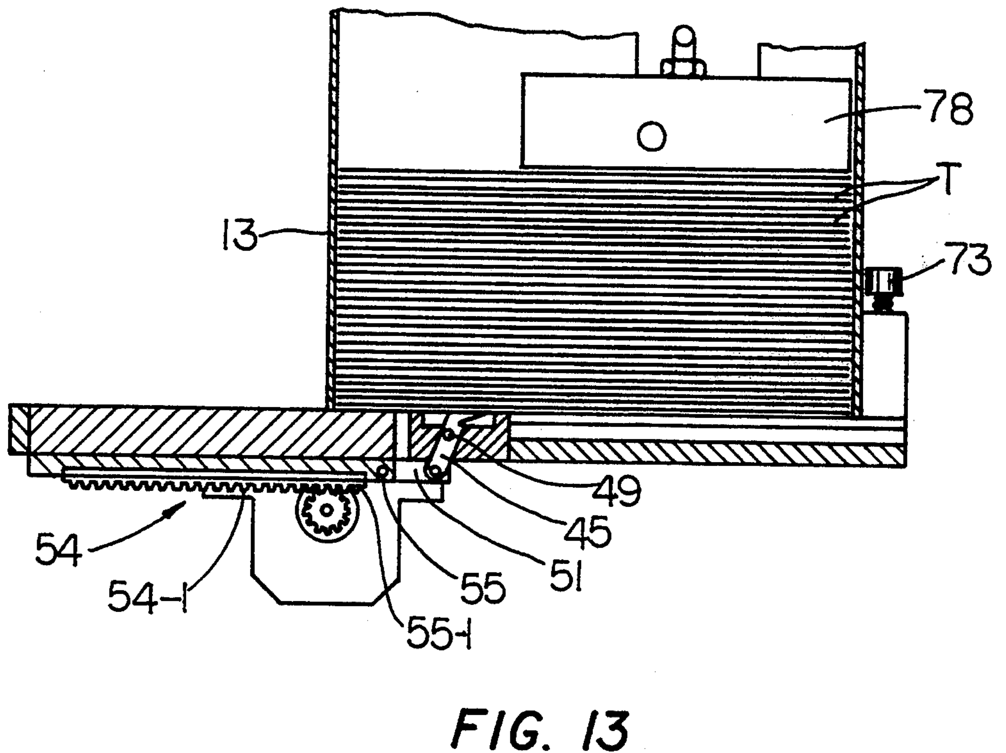
FIG. 13 is a fragmentary diagrammatic representation of the apparatus of FIG. I before the toothed blade is brought into engagement with a ticket.
Figure 14:
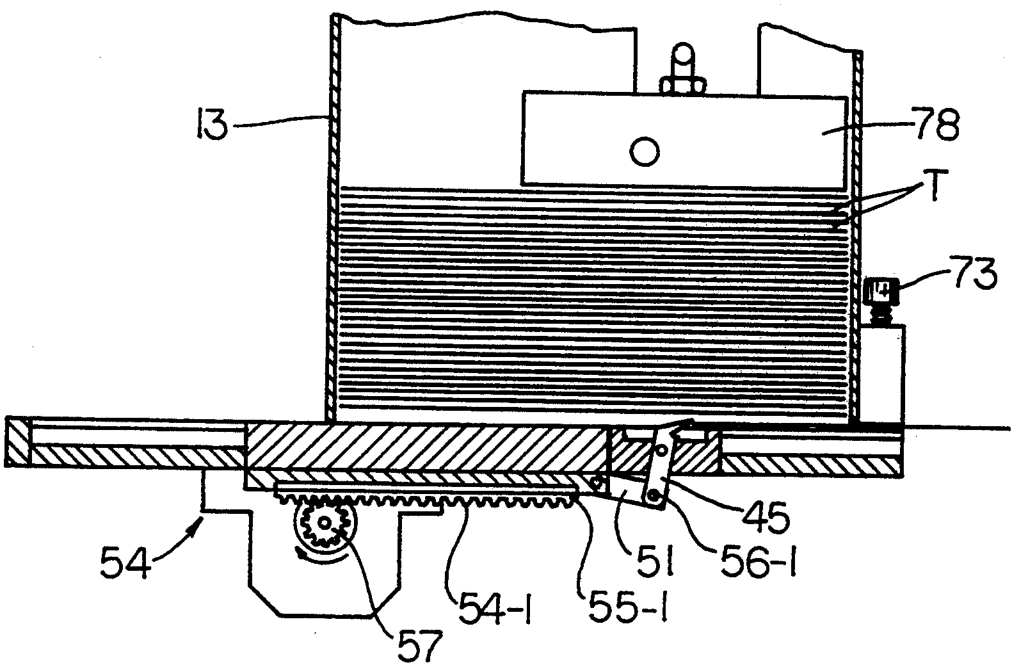
FIG. 14 is a view similar to FIG. 13 but with the blade engagement with a ticket and pushing the ticket part way through the gate.

In the operation of transport mechanism 41, see especially FIGS. 13 and 14, first slider element 47 is disposed underneath stack S spaced away from second slider element 50 with top surface 46-3 of head 46-1 of blade 45 horizontal. Movement of rack 54 forward by pinion 57 will cause linkage 51 to pivot which in turn will cause head 46-1 of blade 45 to pivot upward and engage the underside of the lowermost ticket T in stacks. Continued movement of second slider element 50 forward will cause first slider element 47 to be pushed forward carrying with it the lowermost ticket T in stack S.

After ticket T is pushed into gate 43, motor 59 is reversed causing second slider element 50 to be moved back to its original position, pulling first slider element 47 with it. The movement will result in head portion 46-1 of blade 45 returning to a horizontal position. Once back to its original position, blade 45 is ready to engage the lowermost ticket T from stack S.

Figure 16:
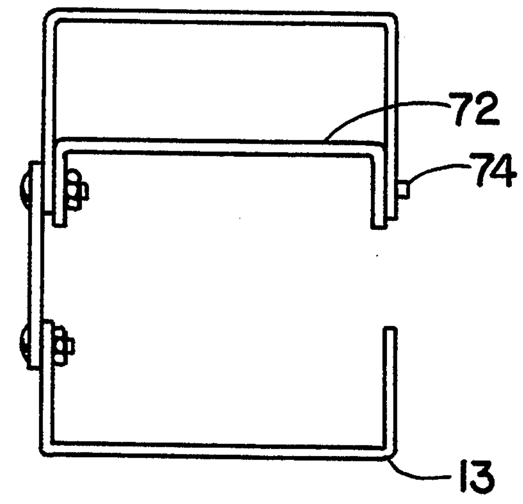
FIG. 16 is a top view showing the partition wall in FIG. 15 in place in one position in the frame in FIG. 1.
Figure 15:
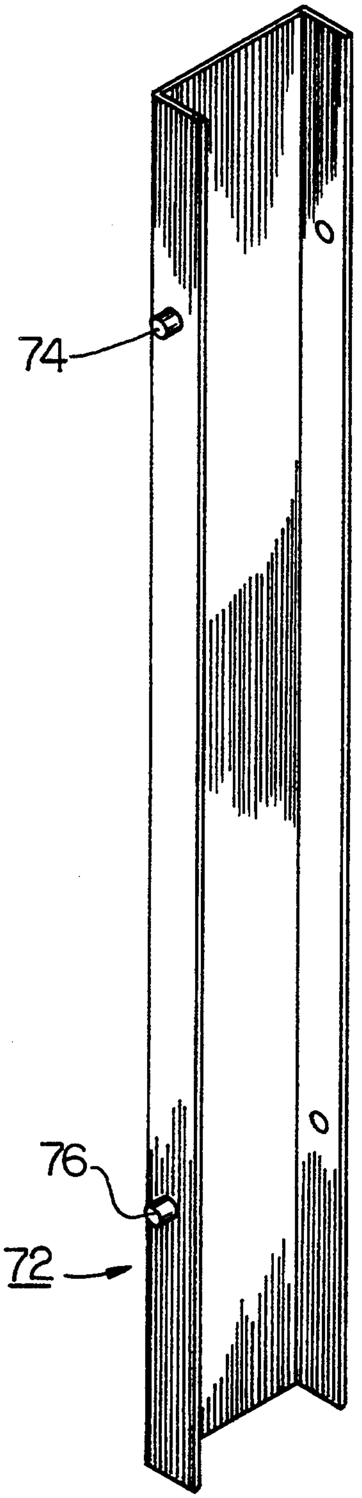
FIG. 15 is a perspective view of a partition wall for use with the frame in the apparatus in FIG. 1.

Referring now to FIG. 15 there is shown a perspective view of partition wall 72 which may be used to change the area inside frame 23 to snugly hold smaller sized tickets without having to disassemble frame 23. Hall 72 is generally U shaped and provided with upper and lower pins 74 and 76 which are intended to fit into the notches 39 in frame 23, the particular notches used depending on the particular area to be partitioned off. A top view of wall 72 in frame 23 in one position is Illustrated in FIG. 16.

Figure 17:
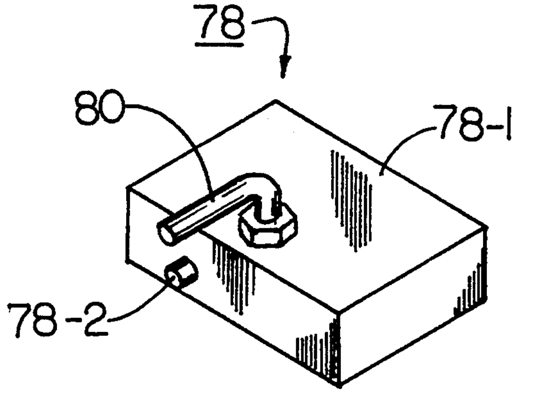
FIG. 17 is a perspective view of the weight shown in the apparatus in FIG. 1.

Referring now to FIG. 17 there is shown a perspective view of a removable weight 78 for use in pushing stack S down so that toothed blade 45 will engage the lowermost ticket T and move it by frictional engagement. Weight 78 is shown in place in FIG. 1. Weight 78 includes a block 78-1 of a heavy material. A handle 80 is provided for holding weight 7S and a pin is provided for limiting movement when in place.

Figure 18:
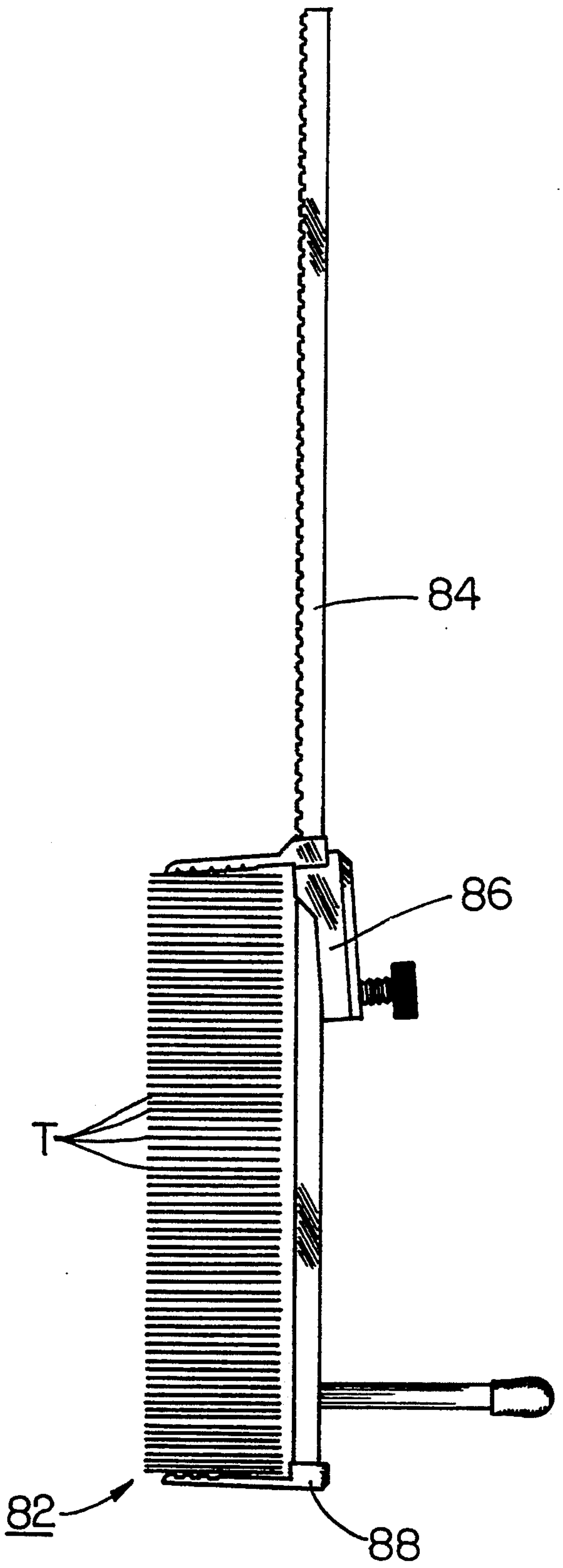
FIG. 18 is a side view of a ticket holder for use in loading tickets in the frame in the apparatus in FIG. 1.

Referring now to FIG. 18 there is shown a perspective view of a holder 82 for use in loading tickets T into frame 23. Holder 82 includes an elongated rod 84 and a two part clamp 86 and 88, the upper part 86 being movable and capable of being tightened in place. In loading tickets T into frame 23, holder 82 is inserted into frame 23 through side opening 30-1.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. Apparatus for dispensing tickets from a stack comprising:
   (a) a frame for enclosing a stack of tickets,
   (b) a gate for receiving tickets from said stack and allowing only one ticket at a time to pass through,
   (c) a toothed blade disposed underneath said frame, and
   (d) means coupled to said toothed blade for bringing said toothed blade into engagement with a lowermost ticket in said stack, moving said toothed blade so that the lowermost ticket is transported from said stack into said gate, bringing said toothed blade out of engagement with said ticket and then moving said toothed blade back to engage the next ticket in the stack, said means including a rack and pinion, said rack being coupled to said toothed blade, wherein said toothed blade includes a head portion having a serrated edge and a bifurcated stem portion.

2. Apparatus for dispensing tickets from a stack comprising:
   (a) a frame for enclosing a stack of tickets,
   (b) a gate for receiving tickets from said stack and allowing only one ticket at a time to pass through,
   (c) a toothed blade disposed underneath said frame, and
   (d) means coupled to said toothed blade for bringing said toothed blade into engagement with a lowermost ticket in said stack, moving said toothed blade so that the lowermost ticket is transported from said stack into said gate, bringing said toothed blade out of engagement with said ticket and then moving said toothed blade back to engage the next ticket in the stack, said means including a rack and pinion, said rack being coupled to said toothed blade, wherein said means coupled to said toothed blade further includes a reversible motor for driving said pinion.

3. Apparatus for dispensing tickets from a stack comprising:

(a) a frame for enclosing a stack of tickets, (b) a gate for receiving tickets from said stack and allowing only one ticket at a time to pass through, (c) a toothed blade disposed underneath said frame, and (d) means coupled to said toothed blade for bringing said toothed blade into engagement with a lowermost ticket in said stack, moving said toothed blade so that the lowermost ticket is transported from said stack into said gate, bringing said toothed blade out of engagement with said ticket and then moving said toothed blade back to engage the next ticket in the stack, said means including a rack and pinion, said rack being coupled to said toothed blade, further including an adjustable holder for use in loading tickets into the frame, said holder comprising an elongated rod and a two part clamp on said rod, one part of said clamp being movable along said rod.

4. The apparatus of claim 1 and further including a weight for pushing down on said stack to enable said toothed blade to engage said lowermost ticket in said stack.

5. Apparatus for dispensing tickets from a stack comprising:

(a) a frame for enclosing a stack of tickets, (b) a gate for receiving tickets and allowing only one ticket at a time to pass through, (c) a toothed blade disposed underneath said frame, and (d) a motor driven rack and pinion coupled to said toothed blade for bringing said toothed blade into engagement with the lowermost ticket in said stack, moving said toothed blade so that the lowermost ticket is transported from said stack into said gate, bringing said toothed blade out of engagement with said ticket and then moving said toothed blade back so that it can be brought into engagement with the next ticket in the stack.

6. Apparatus for dispensing tickets from a stack comprising:

(a) a frame for enclosing a stack of tickets, (b) a gate for receiving tickets and allowing only one ticket at a time to pass through, and (c) a ticket advancing mechanism for moving a lowermost ticket from said stack into said gate, said ticket advancing mechanism including a toothed blade and a motor driven rack and pinion for moving said toothed blade.

7. The apparatus of claim 6 and wherein said frame is constructed for holding said tickets in said stack, one on top of the other.

8. Apparatus for dispensing tickets from a stack comprising:

(a) a base, (b) a frame for enclosing a stack of tickets, said frame being fixedly mounted on said base and extending vertically upward, (c) a gate for receiving tickets and allowing only one ticket at a time to pass through, (d) a toothed blade disposed underneath said frame, and (e) means coupled to said toothed blade for bringing said toothed blade into engagement with a lowermost ticket in said stack, moving said toothed blade so that the lowermost ticket is transported from said stack into said gate, bringing said toothed blade out of engagement with said ticket and then moving said toothed blade back to engage the next ticket in the stack, said means including a rack and pinion, a first slider element slidably mounted on said base and a second slider element slidably mounted on said base, said toothed blade being pivotally mounted on said first slider element, said rack being fixedly mounted on said second slider element, said toothed blade being pivotally coupled to said second slider element by a linkage and said reversible motor being fixedly mounted on said base.

9. Apparatus for dispensing tickets from a stack comprising:

(a) a frame for enclosing a stack of tickets, (b) a gate for receiving tickets and allowing only one ticket at a time to pass through, (c) a toothed blade disposed underneath said frame, (d) means coupled to said toothed blade for bringing said toothed blade into engagement with a lowermost ticket in said stack, moving said toothed blade so that the lowermost ticket is transported from said stack into said gate, bringing said toothed blade out of engagement with said ticket and then moving said toothed blade back to engage the next ticket in the stack, and (e) an adjustable partition wall removably mounted in said frame for adjusting the inside area of the frame to snugly accommodate different sized tickets.

10. Apparatus for dispensing tickets from a stack comprising:

(a) a base (b) a frame on said base for enclosing a stack of tickets, (c) a gate for receiving tickets and allowing only one ticket at a time to pass through, said gate including a U frame fixedly mounted on the base, a slider slidably mounted on the U frame and a spring loaded screw assembly screwed onto said base for adjusting the position of the slider relative to the U frame, (d) a toothed blade disposed underneath said frame, and (e) means coupled to said toothed blade for bringing said toothed blade into engagement with a lowermost ticket in said stack, moving said toothed blade so that the lowermost ticket is transported from said stack into said gage, bringing said toothed blade out of engagement with said ticket and then moving said toothed blade back to engage the next ticket in the stack.

* * * * *